US012784947B2

(12) United States Patent
Shi et al.

(10) Patent No.: US 12,784,947 B2
(45) Date of Patent: Nov. 3, 2026

(54) R-T-B-BASED SINTERED MAGNET AND PREPARATION METHOD THEREFOR

(71) Applicant: FUJIAN GOLDEN DRAGON RARE-EARTH Co., Ltd., Fujian (CN)

(72) Inventors: Yao Shi, Fujian (CN); Qin Lan, Fujian (CN); Jiaying Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 753 days.

(21) Appl. No.: 17/784,996

(22) PCT Filed: Jul. 7, 2020

(86) PCT No.: PCT/CN2020/100575
§ 371 (c)(1),
(2) Date: Jun. 13, 2022

(87) PCT Pub. No.: WO2021/135143
PCT Pub. Date: Jul. 8, 2021

(65) Prior Publication Data

US 2023/0021772 A1 Jan. 26, 2023

(30) Foreign Application Priority Data

Dec. 31, 2019 (CN) ......................... 201911423952.3
Jan. 8, 2020 (CN) ......................... 202010016222.8

(51) Int. Cl.
*H01F 1/057* (2006.01)
*B22F 3/10* (2006.01)
(Continued)

(52) U.S. Cl.
CPC .......... *H01F 1/0577* (2013.01); *B22F 3/1017* (2013.01); *B22F 9/04* (2013.01);
(Continued)

(58) Field of Classification Search
CPC ............... H01F 1/0577; H01F 41/0293; H01F 41/0273; H01F 41/0253; B22F 3/1017;
(Continued)

(56) References Cited

U.S. PATENT DOCUMENTS 8,298,351 B2 10/2012 Fukui
9,863,021 B2 1/2018 Sun
(Continued)

FOREIGN PATENT DOCUMENTS

CN 102360654 A 2/2012
CN 103996475 A 8/2014
(Continued)

OTHER PUBLICATIONS

Zhong Zhenchen [CN109434092A] (machine translation) (Year: 2019).*
(Continued)

*Primary Examiner* — Sally A Merkling
*Assistant Examiner* — Nazmun Nahar Shams
(74) *Attorney, Agent, or Firm* — Houston Beshining Law Office PLLC; Liangang Ye

(57) ABSTRACT

An R-T-B-based sintered magnet and a preparation method therefor. The R-T-B-based sintered magnet comprises: R, B, Ti, Ga, Al, Cu, and T. The contents thereof are as follows: R is 29.0-33%; the content of B is 0.86-0.93%; the content of Ti is 0.05-0.25%; the content of Ga is 0.3-0.5%, but not 0.5%; the content of Al is 0.6-1%, but not 0.6%; the content of Cu is 0.36-0.55%. The percentage is the mass percentage. Under the condition that no heavy rare earth is added or a small amount of heavy rare earth is added, by using a low B technology, not only the remanence performance of the R-T-B-based sintered magnet is improved, but also the coercivity and the squareness of the magnet are ensured.

11 Claims, 1 Drawing Sheet

(51) Int. Cl.

| | |
|---|---|
| ***B22F 3/24*** | (2006.01) |
| ***B22F 9/04*** | (2006.01) |
| ***H01F 41/02*** | (2006.01) |

(52) U.S. Cl.

CPC .... *H01F 41/0293* (2013.01); *B22F 2003/248* (2013.01); *B22F 2009/043* (2013.01); *B22F 2009/044* (2013.01)

(58) Field of Classification Search

CPC .................. B22F 9/04; B22F 2003/248; B22F 2009/043; B22F 2009/044; B22F 5/00; B22F 9/023; B22F 2009/048; B22F 2999/00; B22F 3/24; C22C 33/0257; C22C 38/002; C22C 38/005; C22C 38/06; C22C 38/10; C22C 38/14; C22C 38/16

USPC .......................................................... 148/302

See application file for complete search history.

(56) References Cited

U.S. PATENT DOCUMENTS

| | | | | |
|---|---|---|---|---|
| 10,096,413 B2 | 10/2018 | Nagata | | |
| 2016/0189837 A1* | 6/2016 | Ishii | C22C 38/16 | 419/29 |
| 2018/0047504 A1 | 2/2018 | Nishiuchi et al. | | |
| 2021/0054484 A1 | 2/2021 | Lan et al. | | |

FOREIGN PATENT DOCUMENTS

| | | | |
|---|---|---|---|
| CN | 105321647 | A | 2/2016 |
| CN | 110619984 | A | 12/2019 |
| CN | 111081444 | A | 4/2020 |
| WO | 2016133080 | A1 | 8/2016 |

OTHER PUBLICATIONS

Wu Ting Lang [CN108831650A] (machine translation) (Year: 2018).*

1. Feng Lifeng [CN110444360A] (machine translation) (original provided in the IDS) (Year: 2019).*

2. Feng Lifeng [CN110473682A] (machine translation) (original provided in the IDS) (Year: 2019).*

Oct. 13, 2020 International Search Report issued in International Patent Application No. PCT/CN2020/100575.

Oct. 13, 2020 Written Opinion of the International Searching Authority issued in International Patent Application No. PCT/CN2020/100575.

Chinese priority application No. 201911423952.3 (not published).

English translation of Chinese priority application No. 201911423952.3.

* cited by examiner

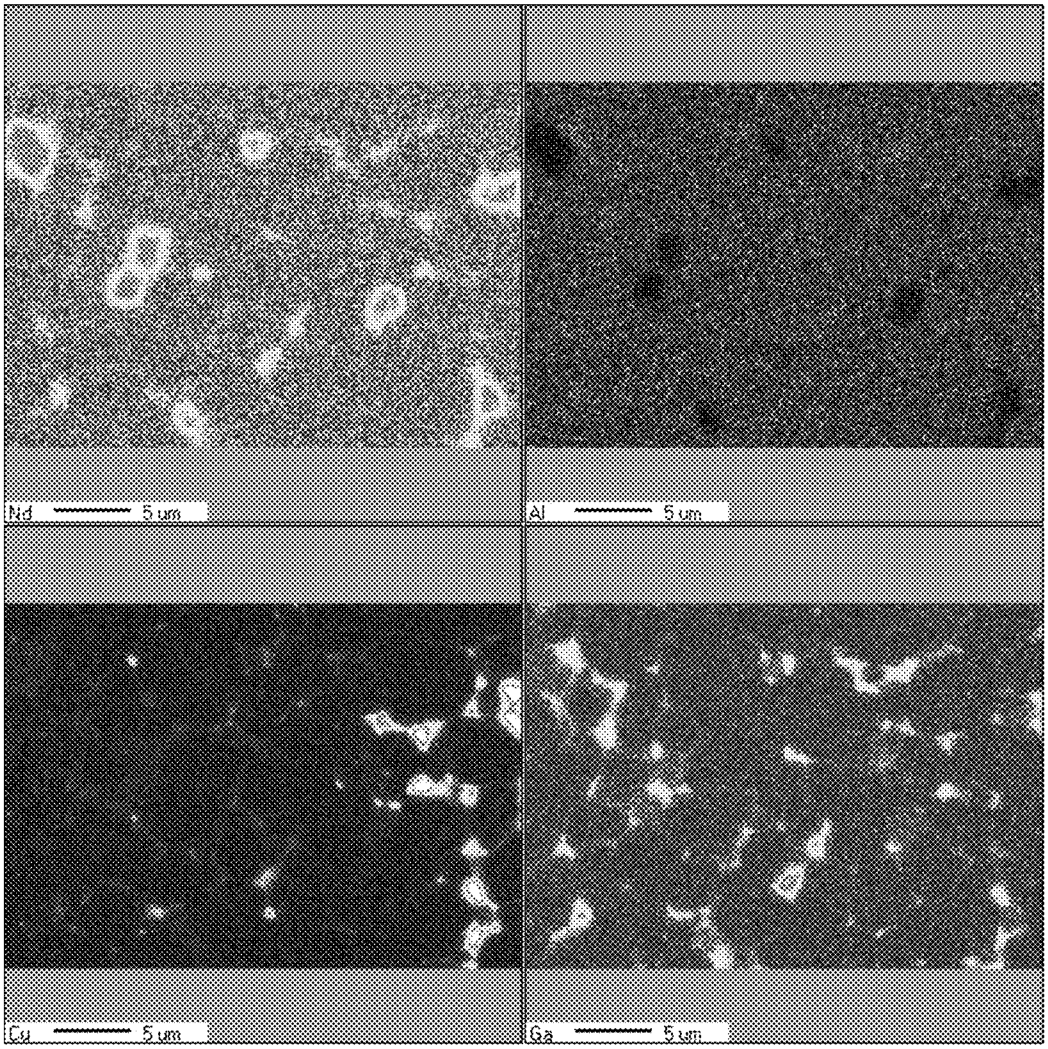
Nd 5 um
Al 5 um
Cu 5 um
Ga 5 um

R-T-B-BASED SINTERED MAGNET AND PREPARATION METHOD THEREFOR

The present application is a National Stage of International Application No. PCT/CN2020/100575, filed on 7 Jul. 2020, which claims priority of the Chinese Patent Application No. CN201911423952.3, filed on 31 Dec. 2019. The contents of which are incorporated herein by reference in their entireties.

TECHNICAL FIELD

The present invention belongs to the field of an R-T-B-based sintered magnet and a preparation method therefor.

BACKGROUND

R-T-B-based sintered magnet (R refers to rare earth element, T refers to transition metal elements and group MA elements, and B refers to boron) has been widely used, due to their excellent magnetic properties, in fields like electronic products, automobiles, wind power, electric appliances, elevators and industrial robots, for example, hard drives, mobile phones, earphones, and permanent magnet motors as energy sources such as traction machines for elevators and generators. Demand of R-T-B-based sintered magnet is growing increasingly, and requirements of magnet performance of manufacturers, for example, remanence (abbre. Br) and coercivity, are increasing.

In the experiment, it is found that it is easy to precipitate $R_2Fe_{17}$ phase in R-T-B-based sintered magnet preparation, thereby deteriorating the coercivity of the magnet. In the prior art, the coercivity of the material and the temperature coefficient can be improved by adding heavy rare earth elements such as Dy, Tb, Gd, etc. However, due to the high price of heavy rare earth, this method for improving the coercivity of R-T-B-based sintered magnet will increase the cost of raw materials, which is not conducive for the application of R-T-B-based sintered magnet.

Therefore, it is necessary to prepare R-T-B-based sintered magnet which has high coercivity with adding no heavy rare earth or a small amount of heavy rare earth. For example, in patent CN106128673A, a sintered neodymium-iron-boron magnet (11.77 kGs of remanence, 22.42 kOe of coercivity) was prepared. However, B content of the sintered neodymium-iron-boron magnet is high, which lead to more B-rich phase, thereby affecting the residual magnetic properties of the product. This problem needs to be urgently resolved.

CONTENT OF THE PRESENT INVENTION

The technical problem to be solved in the present invention is that it is difficult to prepare R-T-B-based sintered magnet with high coercivity and high remanence with adding no heavy rare earth or a small amount of heavy rare earth (the addition amount of heavy rare earth RH≤1) in the prior art, and for solving the problem, an R-T-B-based sintered magnet and a preparation method therefor are provided. With adding no heavy rare earth or a small amount of heavy rare earth, the present invention inhibits the precipitation of $R_2Fe_{17}$ phase through a joint addition of a trace amount of Ti and Ga, Al, Cu and Co, and generates phase $R_x$—$(Cu_a$—$Ga_b$—$Al_c)_y$ with high Cu and low Al in grain boundary phase during aging, which greatly enhancing the coercivity of the magnet.

The present invention solves technical problem described above by the following technical solutions.

The present invention discloses an R-T-B-based sintered magnet, wherein the R-T-B-based sintered magnet comprises R, B, Ti, Ga, Al, Cu and T by the following percentage:

29.0-33% of R;
0.86-0.93% of B;
0.05-0.25% of Ti;
0.3-0.5% of Ga, exclusive of 0.5%;
0.6-1% of Al, exclusive of 0.6%;
0.36-0.55% of Cu;

wherein, R is rare earth element comprising at least Nd, B is boron, Ti is titanium, Ga is gallium, Al is aluminum, Cu is copper, T comprises Fe and Co; the percentage is mass percentage.

In the present invention, the content of R can be conventional in the art, preferably, wherein R is 30.2-33%, such as 30.2%, 31.5% or 33%; the percentage is mass percentage.

In the present invention, R is rare earth element comprising heavy rare earth element RH, preferably, wherein RH is 0 or not more than 1%, such as 0% or 0.5%; the percentage is mass percentage.

In the present invention, by using a low B technology, high-performance R-T-B-based sintered magnet can be effectively obtained with adding no heavy rare earth or adding a small amount of heavy rare earth (RH=0 or RH≤1).

In the present invention, B is 0.86-0.93%. If B is less than 0.86%, the squareness of magnet will be worse. If B is more than 0.93%, the high performance of magnet will not be achieved.

Preferably, B is 0.915-0.93%, such as 0.915%, 0.92% or 0.93%; the percentage is mass percentage.

In the present invention, preferably, the R-T-B-based sintered magnet comprises main phase and grain boundary phase, wherein the main phase comprises $R_2T_{14}B$, the boundary phase comprises $R_x$—$(Cu_a$—$Ga_b$—$Al_c)_y$ and rare earth oxide phase;

wherein, x/y=1.5-3; a/b=2-5; (a+b)/c=30-70;

the main phase is 94-98%; the $R_x$—$(Cu_a$—$Ga_b$—$Al_c)_y$ is 1-3.5%; the rare earth oxide phase is 1-2.5%, the percentage is volume percentage.

More preferably, in the boundary phase $R_x$—$(Cu_a$—$Ga_b$—$Al_c)_y$, x/y=1.5-3, a:b:c=(10-40):(6-19):1.

In the present invention, the precipitation of $R_2T_{17}$ is effectively inhibited by adding an appropriate amount of Ti, Ga, Al, and Cu. The inventor found that although a large amount of Al was added, due to the addition of a trace amount of Ti, the R-T-B-based sintered magnet did not form a high Al grain boundary phase in the grain boundary, but formed a high Cu and low Al grain boundary phase $R_x$—$(Cu_a$—$Ga_b$—$Al_c)_y$. The formation of this phase plays a role in modifying the grain boundary, improving wetting angle and fluidity of the grain boundary phase, therefore it is easier for the grain boundary to flow between the main phases, and furthermore, the grain boundary phase became thin and continuous. The formation of this phase not only plays a role in demagnetization coupling but also in increasing volume fraction of the main phase, resulting in a magnet with excellent Br and Hcj. Herein, those skilled in the art would be aware that the rare earth oxide phase was obtained through an inevitable oxidation reaction.

Preferably, Ti is 0.15-0.25%, such as 0.15%, 0.2% or 0.25%; the percentage is mass percentage.

Preferably, Ga is 0.3-0.455%, such as 0.3%, 0.4% or 0.455%; the percentage is mass percentage.

Preferably, Al is 0.65-1%, exclusive of 1%, such as 0.65%, 0.7%, 0.8% or 0.9%; the percentage is mass percentage.

Preferably, Cu is 0.45-0.55%, such as 0.45%, 0.5% or 0.55%; the percentage is mass percentage.

In the present invention, the content of the Fe and Co is conventional in the art.

Preferably, the content of Fe and Co are a balance of 100% by mass; the percentage is mass percentage.

More preferably, Co is 0.5-3%, such as 0.5%, 1.5% or 3.0%; the percentage is mass percentage.

More preferably, Fe is 60-68%; the percentage is mass percentage.

In the present invention, the R-T-B-based sintered magnet comprises an inevitable impurities and O, N or C introduced during the preparation.

Preferably, the total content of C, N and O in the R-T-B-based sintered magnet is 1000 ppm-3500 ppm.

In a preferred embodiment of the present invention, the R-T-B-based sintered magnet comprises 31.5% of Nd, 0.92% of B, 0.5% of Co; 0.9% of Al, 0.45% of Cu, 0.455% of Ga, 0.2% of Ti, and Fe as a balance; the percentage is mass percentage In a preferred embodiment of the present invention, the R-T-B-based sintered magnet comprises 31.5% of Nd, 0.92% of B, 0.5% of Co; 1.0% of Al, 0.5% of Cu, 0.455% of Ga, 0.2% of Ti, and Fe as a balance; the percentage is mass percentage;

In a preferred embodiment of the present invention, the R-T-B-based sintered magnet comprises 31.5% of Nd, 0.5% of Dy; 0.915% of B, 0.5% of Co; 0.7% of Al, 0.55% of Cu, 0.455% of Ga, 0.25% of Ti, and Fe as a balance; the percentage is mass percentage;

In a preferred embodiment of the present invention, the R-T-B-based sintered magnet comprises 30.2% of Nd, 0.93% of B, 1.5% of Co; 0.65% of Al, 0.4% of Cu, 0.3% of Ga, 0.15% of Ti, and Fe as a balance; the percentage is mass percentage;

In a preferred embodiment of the present invention, the R-T-B-based sintered magnet comprises 33% of Nd, 0.86% of B, 3.0% of Co; 0.8% of Al, 0.36% of Cu, 0.4% of Ga, 0.05% of Ti, and Fe as a balance; the percentage is mass percentage.

The present invention also provides an R-T-B-based sintered magnet, wherein the R-T-B-based sintered magnet comprises a main phase and a grain boundary; wherein the main phase comprises $R_2T_{14}B$, the grain boundary phase comprises $R_x$—$(Cu_a$—$Ga_b$—$Al_c)_y$ and rare earth oxide phase;

wherein, x/y=1.5-3; a/b=2-5; (a+b)/c=30-70;

the main phase is 94-98%; the $R_x$—$(Cu_a$—$Ga_b$—$Al_c)_y$ is 1-3.5%; the rare earth oxide phase is 1-2.5%, the percentage is volume percentage;

preferably, in the grain boundary $R_x$—$(Cu_a$—$Ga_b$—$Al_c)_y$, x/y=1.5-3, a:b:c=(10-40):(6-19):1.

The present invention also discloses a method for preparing the R-T-B-based sintered magnet described above, wherein the method involves smelting, casting, hydrogen decrepitating, jet milling, forming, sintering and aging a raw material of the R-T-B-based sintered magnet successively.

In the present invention, raw materials of the R-T-B-based sintered magnet is known by those skilled in the art to satisfy the mass percentage of element contents of the R-T-B based sintered magnet described above.

In the present invention, the smelting has conventional operations and conditions in the art.

Preferably, the smelting is carried out in a high frequency induction vacuum melting furnace.

Preferably, the melting furnace has a vacuum degree of less than 0.1 Pa.

More preferably, the melting furnace has a vacuum degree of less than 0.02 Pa.

Preferably, the smelting has a temperature of 1450-1550° C.

More preferably, the smelting temperature of 1500-1550° C.

In the present invention, the operations and conditions of the casting can be conventional in the art, generally under inert gas conditions, and an R-T-B alloy casting strip is obtained.

Preferably, the casting is carried out under an Ar gas condition.

Preferably, the casting is carried out at a gas pressure of 20-70 kPa.

More preferably, the casting is carried out at a gas pressure of 30-50 kPa.

Preferably, the casting has a copper roller wheel speed of 0.4-2 m/s, such as 1 m/s.

Preferably, the casting produces an R-T-B alloy sheet having a thickness of 0.15-0.5 mm.

More preferably, the R-T-B alloy sheet has a thickness of 0.2-0.35 mm, such as 0.25 mm.

In the present invention, the hydrogen decrepitating has conventional operations and conditions of in the art. In general, the hydrogen decrepitating comprises a hydrogen adsorption and a dehydrogenation. The R-T-B alloy casting strip can be hydrogen decrepitated to obtain an R-T-B alloy powder.

Preferably, the hydrogen decrepitation has a hydrogen absorption temperature of 20-300° C., such as 25° C.

Preferably, the hydrogen decrepitation has a hydrogen absorption pressure of 0.12-0.19 MPa, such as 0.19 MPa.

Preferably, the hydrogen decrepitation has a hydrogen desorption time of 0.5-5 h, such as 2 h.

Preferably, the hydrogen decrepitation has a hydrogen desorption temperature of 450-600° C., such as 550° C.

In the present invention, the jet milling has conventional operations and conditions in the art. Preferably, the jet milling is to add the R-T-B alloy powder into jet milling machine for successively pulverizing by jet milling to obtain a fine powder.

More preferably, the fine powder has a medium value particle size $D_{50}$ of 3-5.5 μm, such as 4 μm.

More preferably, the jet milling has a pulverization pressure of 0.3-0.5 MPa, such as 0.4 MPa.

In the present invention, the forming has conventional operations and conditions in the art.

Preferably, the forming is carried out under a magnetic field strength above 1.8 T, such as 1.8 T and protection of nitrogen gas atmosphere.

In the present invention, the sintering has conventional operations and conditions in the art.

Preferably, the sintering comprises four steps:

(1) a heat treatment at a temperature of 150-300° C. for 1-4 h;

(2) a heat treatment at a temperature of 400-600° C. for 1-4 h;

(3) a heat treatment at a temperature of 800-900° C. for 1-4 h;

(4) a heat treatment at a temperature of 1000-1090° C. for more than 3 h.

In a preferred embodiment of the present invention, due to the addition of a trace amount of Ti, the growth of grain can be inhibited, and the temperature range of the sintering can be expanded to a certain extent.

In the present invention, the aging has conventional operations and conditions in the art.

Preferably, the aging comprises a primary aging and a secondary aging.

More preferably, the primary aging has a temperature of 850° C.-950° C., such as 900° C.

More preferably, the secondary aging has a temperature of 440° C.-540° C., such as 480° C.

In a preferred embodiment of the present invention, due to the high addition amount of Al, the secondary aging temperature of the magnet with this composition can be ranged from 440° C. to 540° C., with a fluctuation of 100° C., which is beneficial for mass production.

BRIEF DESCRIPTION OF THE DRAWING

FIG. 1 is a graph illustrating an observation result of the R-T-B-based sintered magnet of Example 1 by means of EPMA.

DETAILED DESCRIPTION OF THE PREFERRED EMBODIMENT

The present invention will be further illustrated by Examples described below, which, however, are not intended to limit the scope of the present invention. For the experimental methods in which no specific conditions are specified in the following Examples, selections are made according to conventional methods and conditions or according to the product instructions.

Element mass percent and magnetic properties of the R-T-B-based sintered magnets in Examples 1-5 and Comparative Examples 6-12 are shown in Table 1 below. In Table 2, “Br” referred to remanence, “Hcj” referred to intrinsic coercivity, and Hk/Hcj referred to squareness (squareness ratio), ‘/’ referred to being free of the element.

TABLE 1

Element mass percentage and magnetic properties of the R-T-B-based sintered magnets

| NOs: | Nd | Pr | Dy | Fe | B | Co | Al | Cu | Ga | Ti | Br | Hcj | Hk/Hcj |
|---|---|---|---|---|---|---|---|---|---|---|---|---|---|
| 1 | 31.5 | / | / | bal. | 0.92 | 0.5 | 0.9 | 0.45 | 0.455 | 0.2 | 13.23 | 22.33 | 0.98 |
| 2 | 31.5 | / | / | bal. | 0.92 | 0.5 | 1.0 | 0.5 | 0.455 | 0.2 | 12.95 | 22.8 | 0.98 |
| 3 | 31.5 | / | 0.5 | bal. | 0.915 | 0.5 | 0.7 | 0.55 | 0.455 | 0.25 | 13 | 23.2 | 0.99 |
| 4 | 30.2 | / | / | bal. | 0.93 | 1.5 | 0.65 | 0.4 | 0.3 | 0.15 | 13.5 | 20.52 | 0.97 |
| 5 | 33 | / | / | bal. | 0.86 | 3.0 | 0.8 | 0.36 | 0.4 | 0.05 | 12.5 | 20.6 | 0.95 |
| 6 | 31.5 | 0 | 0 | bal. | 0.92 | 0.5 | 0.7 | 0.4 | 0.455 | 0 | 13.3 | 19.8 | 0.97 |
| 7 | 31.5 | 0 | 0 | bal. | 0.92 | 0.5 | 0.55 | 0.4 | 0.455 | 0.2 | 13.09 | 20.6 | 0.96 |
| 8 | 31.5 | 0 | 1.5 | bal. | 0.92 | 0.5 | 0.7 | 0.4 | 0.455 | 0.2 | 12.5 | 22.03 | 0.98 |
| 9 | 31.5 | 0 | 2.5 | bal. | 0.92 | 0.5 | 0.7 | 0.4 | 0.455 | 0.2 | 12.13 | 24.3 | 0.99 |
| 10 | 24.45 | 7.91 | 0 | bal. | 0.95 | 0.53 | 0.37 | 0.13 | 0.53 | 0.36 | 12.77 | 22.42 | 0.95 |
| 11 | 31.5 | 0 | 0 | bal. | 0.83 | 0.5 | 0.7 | 0.4 | 0.455 | 0.2 | 13.03 | 21.6 | 0.85 |
| 12 | 31.5 | 0 | 0 | bal. | 0.92 | 0.5 | 0.7 | 0.2 | 0.2 | 0.5 | 12.63 | 17.9 | 0.95 |

The present invention also provides an R-T-B-based sintered magnet which is prepared by the preparation method as described above.

The present invention also provides a use of the R-T-B-based sintered magnet as described above as a magnetic steel of motor rotor.

Those of skill in the art should be understood that, in the present invention, the preferred conditions described above can be arbitrarily combined to obtain each preferred example of the present invention.

The raw materials and reagents of the present invention are commercially available.

The positive and progressive effects of the present invention are:

In the present invention, by using a low B technology, the structure of grain boundary phase is modified with adding no heavy rare earth or a small amount of heavy rare earth (the addition amount of heavy rare earth RH≤1), the adjustment of abundance ratio of Ti, Ga, Al, Cu and Co in the composition has a synergistic effect and a grain boundary phase $R_x$—$(Cu_a$—$Ga_b$—$Al_c)_y$ with high Cu and low Al is formed during the aging phase. Therefore, the coercivity and the remanence of the sintered magnet are improved.

Example 1

The preparation method for the R-T-B-based sintered magnet was as follows:

(1) Smelting: According to the element mass percentage of all Examples and Comparative examples shown in Table 1, the raw materials that satisfy the element mass percentage were prepared.

The raw materials were smelted in a high frequency induction vacuum melting furnace, wherein the melting furnace had a vacuum degree of less than 0.02 Pa, the smelting had a temperature of 1500-1550° C.

(2) Casting: The casting was carried out under an Ar gas conditions, to obtain an R-T-B alloy sheet.

The casting was carried out at a gas pressure of 30-50 kPa. The casting had a copper roller wheel speed of 1 m/s.

The casting produced an R-T-B alloy sheet having a thickness of 0.25 mm.

(3) Hydrogen decrepitation: The hydrogen decrepitation had a hydrogen absorption temperature of 25° C. The hydrogen decrepitation had a hydrogen absorption pressure of 0.19 MPa. The hydrogen decrepitation had a hydrogen desorption time of 2 h. The hydrogen decrepitation had a hydrogen desorption temperature of 550° C. The R-T-B alloy casting strip was hydrogen decrepitated under conditions above to obtain an R-T-B alloy powder.

(4) Jet milling: The R-T-B alloy powder was added into jet milling machine for successively pulverizing by jet milling to obtain a fine powder. The jet milling had a pulverization pressure of 0.3-0.5 MPa, such as 0.4 MPa.

The fine powder had a medium value particle size $D_{50}$ of 4 μm.

(5) Forming: The fine powder was oriented and formed under a certain magnetic field strength to obtain a compact. The forming was carried out under a magnetic field strength above 1.8 T and the protection of nitrogen gas atmosphere.

(6) Sintering, which was divided into four steps (this batch was 10 kg):

a heat treatment at a temperature of 150-300° C. for 2 h;
a heat treatment at a temperature of 400-600° C. for 2 h;
a heat treatment at a temperature of 800-900° C. for 4 h;
a heat treatment at a temperature of 1000-1090° C. for 5 h.

(7) Aging

The temperature of the primary grade was 900° C.; the temperature of the secondary aging was 480° C.

The parameters in the preparation method are the same as those in the preparation method of Example 1 except that the selected raw materials are different in the preparation methods of Examples 2-5 and Comparative Examples 6-12.

Effect Example

FIG. 1 is a result of micro analysis of Example 1 by a field-emission electron probe micro analyzer (EPMA).

The results of micro analysis of R-T-B-based sintered magnets in Examples 1-5 and Comparative Example 8 are shown in Table 2

TABLE 2

Results of micro analysis of R-T-B-based sintered magnets

| NOs: | Main phase | Content | Grain boundary phase | Content |
|---|---|---|---|---|
| 1 | $Nd_{12.8\text{-}14}Fe_{76\text{-}78}Co_{0.5\text{-}0.6}Al_{0.9\text{-}1.45}B_{5.55\text{-}5.65}$ | 95%-97% | $Nd_{1.5\text{-}2.1} - (Cu_{10\text{-}28} - Ga_{8\text{-}12} - Al_1)_1$ | 1.5-2.5% |
| 2 | $Nd_{12.8\text{-}13.9}Fe_{76\text{-}78}Co_{0.5\text{-}0.6}Al_{1.4\text{-}2.4}B_{5.4\text{-}5.6}$ | 94%-96% | $Nd_{1.5\text{-}1.9} - (Cu_{15\text{-}40} - Ga_{6\text{-}19} - Al_1)_1$ | 2-2.5% |
| 3 | $Nd_{12.8\text{-}14.1}Dy_{0.1\text{-}0.2}Fe_{76\text{-}78}Co_{0.5\text{-}0.6}Al_{1.4\text{-}2.4}B_{5.4\text{-}5.7}$ | 95%-97% | $Nd_{1.5\text{-}2.5}Dy_{0\text{-}0.5} - (Cu_{10\text{-}28} - Ga_{8\text{-}12} - Al_1)_1$ | 2-2.5% |
| 4 | $Nd_{12.5\text{-}13.6}Fe_{76\text{-}78}Co_{0.5\text{-}0.6}Al_{1.2\text{-}1.7}B_{5.5\text{-}5.6}$ | 96%-98% | $Nd_{1.5\text{-}1.9} - (Cu_{10\text{-}26} - Ga_{6\text{-}8} - Al_1)_1$ | 1-2% |
| 5 | $Nd_{13.6\text{-}15.2}Fe_{75\text{-}77}Co_{0.5\text{-}0.6}Al_{1.4\text{-}2}B_{5.1\text{-}5.4}$ | 94%-96% | $Nd_{2.1\text{-}3} - (Cu_{16\text{-}36} - Ga_{12\text{-}16} - Al_1)_1$ | 2.5-3.5% |
| 8 | $Nd_{13.1\text{-}14.2}Fe_{76\text{-}77.5}Co_{0.5\text{-}0.6}Al_{0.3\text{-}0.75}B_{5.3\text{-}5.6}$ | 93%-96% | $Nd_{70\text{-}80}Fe_{5\text{-}15}Cu_{2\text{-}5}Al_{3\text{-}8}Ga_{2\text{-}5}$ | 3%-6.5% |

What is claimed is:

1. An R-T-B-based sintered magnet, wherein the R-T-B-based sintered magnet consists essentially of R, B, Ti, Ga, Al, Cu and T by the following percentage:

29.0-33% of R;
0.86-0.93% of B;
0.05-0.25% of Ti;
0.3-0.5% of Ga, exclusive of 0.5%;
0.6-1% of Al, exclusive of 0.6%;
0.45-0.55% of Cu;
T consists essentially of Fe and Co; the percentage is mass percentage; Fe and Co are a balance of 100% mass percentage;
wherein R is rare earth element comprising at least Nd,
B is boron,
Ti is titanium,
Ga is gallium,
Al is aluminum,
Cu is copper;
the R-T-B-based sintered magnet comprises a main phase and a grain boundary phase; wherein the main phase comprises $R_2T_{14}B$, the grain boundary phase comprises $R_x$—$(Cu_a$—$Ga_b$—$Al_c)_y$ and rare earth oxide phase;
wherein, x/y=1.5-3; a/b=2-5; (a+b)/c=30-70;
the main phase is 94-98%; the $R_x$—$(Cu_a$—$Ga_b$—$Al_c)_y$ is 1-3.5%; the rare earth oxide phase is 1-2.5%, the percentage is volume percentage.

2. The R-T-B-based sintered magnet of claim 1, wherein R is 30.2-33%;
or, R comprises heavy rare earth element RH, wherein RH is 0.5% to not more than 1%;
or, B is 0.915-0.93%;
or, Ti is 0.15-0.25%;
or, Ga is 0.3-0.455%;
or, Al is 0.65-1%, exclusive of 1%;
the percentage is mass percentage.

3. The RTB-based sintered magnet of claim 1, wherein the R-T-B-based sintered magnet consists essentially of 31.5% of Nd, 0.92% of B, 0.5% of Co; 0.9% of Al, 0.45% of Cu, 0.455% of Ga, 0.2% of Ti, and Fe as a balance; the percentage is mass percentage;
or, the R-T-B-based sintered magnet consists essentially of 31.5% of Nd, 0.92% of B, 0.5% of Co; 1.0% of Al, 0.5% of Cu, 0.455% of Ga, 0.2% of Ti, and Fe as a balance; the percentage is mass percentage;
or, the R-T-B-based sintered magnet consists essentially of 31.5% of Nd, 0.5% of Dy; 0.915% of B, 0.5% of Co; 0.7% of Al, 0.55% of Cu, 0.455% of Ga, 0.25% of Ti, and Fe as a balance; the percentage is mass percentage.

4. The R-T-B-based sintered magnet of claim 1, in the grain boundary $R_x$—$(Cu_a$—$Ga_b$—$Al_c)_y$, x/y=1.5-3, a:b:c=(10-40):(6-19):1.

5. A method for preparing the R-T-B-based sintered magnet of claim 1, wherein the method involves smelting, casting, hydrogen decrepitating, jet milling, forming, sintering and aging a raw material of the R-T-B-based sintered magnet successively.

6. The method of claim 5, wherein the smelting is carried out in a high frequency induction vacuum melting furnace;
or, the smelting has a temperature of 1450-1550° C.;
or, the casting is carried out under Ar gas condition;
or, the casting is carried out at a gas pressure of 20-70 kPa;
or, the casting has a copper roller wheel speed of 0.4-2 m/s;

or, the casting produces an R-T-B alloy sheet having a thickness of 0.15-0.5 mm;

or, the hydrogen decrepitation has a hydrogen absorption temperature of 20-300° C.;

or, the hydrogen decrepitation has a hydrogen absorption pressure of 0.12-0.19 MPa;

or, the hydrogen decrepitation has a hydrogen desorption time of 0.5-5 h;

or, the hydrogen decrepitation has a hydrogen desorption temperature of 450-600° C.;

or, the jet milling is to add the R-T-B alloy powder into jet milling machine for successively pulverizing by jet milling to obtain a fine powder;

or, the forming is carried out under a magnetic field strength above 1.8 T, and protection of nitrogen gas atmosphere;

or, the sintering comprises four steps: (1) a heat treatment at a temperature of 150-300° C. for 1-4 h; (2) a heat treatment at a temperature of 400-600° C. for 1-4 h; (3) a heat treatment at a temperature of 800-900° C. for 1-4 h; (4) a heat treatment at a temperature of 1000-1090° C. for more than 3 h;

or, the aging comprises a primary aging and a secondary aging.

7. A magnetic steel of motor rotor comprising the R-T-B-based sintered magnet of claim 1.

8. The R-T-B-based sintered magnet of claim 1, wherein Co is 0.5-3%; or Fe is 60-68%.

9. The method of claim 6, wherein the melting furnace has a vacuum degree of less than 0.1 Pa;

or, the smelting temperature of 1500-1550° C.;

or, the casting is carried out at a gas pressure of 30-50 kPa;

or, the R-T-B alloy sheet has a thickness of 0.2-0.35 mm;

or, the fine powder has a medium value particle size $D_{50}$ of 3-5.5 μm;

or, the jet milling has a pulverization pressure of 0.3-0.5 MPa;

or, the primary aging has a temperature of 850° C.-950° C.;

or, the secondary aging has a temperature of 440° C.-540° C.

10. The method of claim 9, wherein the melting furnace has a vacuum degree of less than 0.02 Pa.

11. The R-T-B-based sintered magnet of claim 1, wherein B is 0.915-0.93%; Ti is 0.15-0.25%; Ga is 0.3-0.455%; Al is 0.65-1%, exclusive of 1%; the percentage is mass percentage.

* * * * *